United States Patent

Gartner et al.

[15] 3,691,309

[45] Sept. 12, 1972

[54] CONTINUITY AND FOREIGN POTENTIAL DETECTOR

[72] Inventors: Todd Gartner, Franklin Park; Hendrik W. Van Husen, Glen Ellyn, both of Ill.

[73] Assignee: Automatic Electric Laboratories, Inc., Northlake, Ill.

[22] Filed: Dec. 21, 1970

[21] Appl. No.: 99,935

[52] U.S. Cl. ........................179/18 AB, 179/175.2 C

[51] Int. Cl. ..............................................H04m 3/22

[58] Field of Search .........179/18 AB, 18 FA, 18 F, 18 FG, 179/18 FF, 175.2 C, 175.21

[56] References Cited

UNITED STATES PATENTS 3,535,462 10/1970 Voegtlen et al.......179/18 AB

*Primary Examiner*—William C. Cooper
*Assistant Examiner*—Thomas W. Brown
*Attorney*—Cyril A. Krenzer, K. Mullerheim and B. E. Franz

[57] ABSTRACT

A marker controlled communications switching system is disclosed which is arranged to automatically and progressively test the talking path as it is set up, prior to completion of the communication connection. The equipment includes saturable core magnetic devices to which the conductors to be tested are connected. An alternating current drive winding and a test winding are also coupled to the cores. The resultant wave shape from the test winding is then compared with a predetermined test wave shape to provide a binary output indicative of the line conductor condition.

10 Claims, 3 Drawing Figures

INVENTORS
HENDRIK W. VAN HUSEN
TODD H. GARTNER

BY Bernard E. Franz
ATTORNEY

CONTINUITY AND FOREIGN POTENTIAL DETECTOR

BACKGROUND OF THE INVENTION

1. Field of the Invention

This invention relates generally to a telephone communication system, and more particularly to a device for determining the condition of the communication path through the switching matrix and the subscriber's loop.

2. Description of the Prior Art

When an originating connection is established in a telephone communications exchange, various equipments within the system cooperate and exchange information items. An additional essential item of this information is the data relative to the called terminal desired by the calling subscriber. This data is received via the subscriber's station loop, a portion of the switching matrix and various other components of the system into a data register. An inadequate path in this connection would result in the improper registration of the dialed data, or even no receipt of data, thus resulting in the call attempt being shorted, and possibly other attempts made to establish a connection. Each of these faults produces an undesirable traffic load for the system, with its useless tying up of functional equipments. The prior art systems attempted to detect malfunctioning components or faulty subscriber's loops during low traffic periods by routine tests of the equipment. These however did not always detect intermittent types of poor contact closures or high resistance contacts.

SUMMARY OF THE INVENTION

Accordingly it is an object of the present invention to provide a device for testing the communications path to a subscriber.

It is another object of this invention to provide a device for performing the tests simultaneously with the setting up of a communications path.

It is a further object of this invention to provide a device capable of performing the tests without any substantial currents in the test conductors.

It is still another object of this invention to provide a device using magnetic core devices for performing the tests.

Briefly, the foregoing objects are accomplished in accordance with aspects of this invention by a testing circuit utilizing a pair of magnetic cores of a type having a substantially rectangular hysteresis characteristic for each line conductor. Such cores have first and second remanent states of magnetization, and, as utilized herein, are advantageously moved toward one of those states by a first interrogation pulse following any change-of-characteristics of the line to produce outputs from one or the other core for transmission to the switching control circuitry.

Specifically, each of the substantially identical cores is coupled by a split winding to the conductors of the loop to sense the conditions and changes-of-condition therein. During the interval before the line relay is connected to the circuit in which no current flows therein, a drive winding is able to alternately place one of the cores in the extreme reset state while placing the other core into the non-biased or neutral reset state so that the cores are out of switching phase. This is accomplished by the application of a 5,000 Hz. square wave through the windings for each of the lines.

These pulses are applied coincidentally to both cores through oppositely wound windings thereon. The pulses from one of the pair of cores for each conductor are then taken to a logic circuit, where they are compared to a standard pulse. The width of the pulses from the test cores determines the resistance encountered in the line conductors, and whether the logic associated with the cores will be set indicating an acceptable condition or reset indicating an unacceptable condition of the line.

BRIEF DESCRIPTION OF THE DRAWINGS

The above mentioned objects and other features of the invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENT

Figure 1:
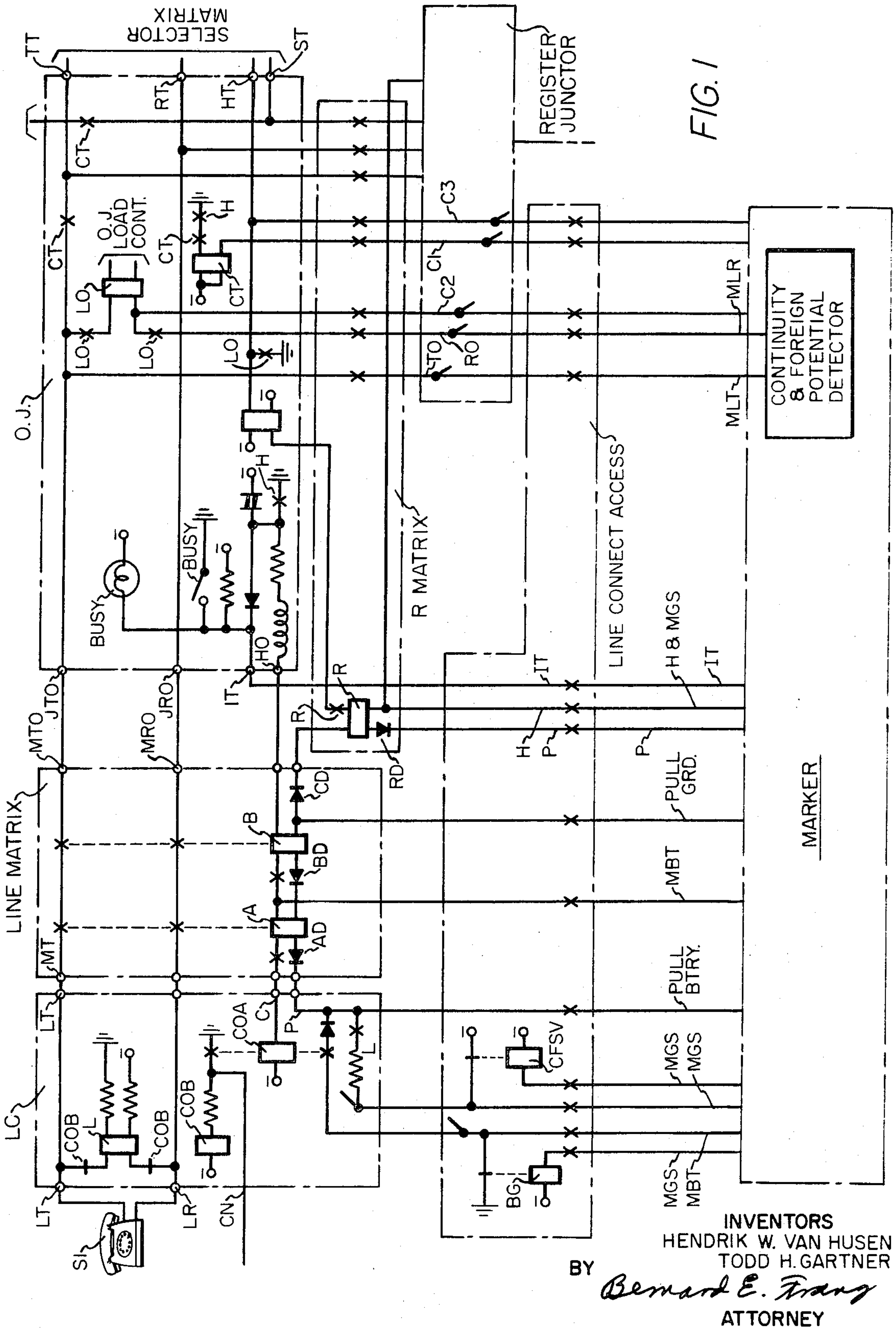
FIG. 1 shows in block diagram form the functional configuration of a portion of a switching matrix and a marker with the device of this invention.

FIG. 1 of the drawing discloses one of an obvious plurality of subscriber stations S1 connected via a pair of conductors to a line circuit LC of the exchange. At the line circuit the line conductors pass through a pair of break contacts of the relay COB and the windings of a line relay L to ground and battery for the tip and ring conductors respectively. The line conductors of the line circuit are connected to the A side of the switching matrix, as are also the matrix pull conductor P and the matrix hold conductor C. The matrix is shown with only a single crosspoint assembly for each of the stages A and B. Each crosspoint includes a pair of windings, a first winding to operate the contacts associated with this crosspoint, and a second or hold winding to maintain the contacts in the operated position. The contacts consist of the make contacts for extending the conductors T and R and a single make contact for extending the hold conductor C. A diode AD and BD is associated with the pull winding of each of the crosspoints A and B. The line conductor path is carried through the matrix crosspoints to the originating junctor OJ, through a register matrix contact set and a register junctor to the marker MLT and MLR terminals where it is connected to the continuity and foreign potential detector. The originating junctor OJ and the register junctor RJ perform the functions of intermediate supervisory circuits in the subscriber's connections and register connections. An additional detailed description of their functions may be found in U.S. Pat. No. 3,170,041 issued Feb. 16, 1965 to K. K. Spellnes.

Line Group Marker. The marker M is used to control the associated line group matrices on an allotted basis. In its idle state the marker continuously scans for requests for service from the line groups with which it is associated. Upon recognizing a call in a particular line group, it locks out all other groups and allows the connect circuitry LCA of the selected group to switch the matrix leads into the marker for processing. Approximately 400 leads are so controlled. Only the leads for a single line circuit connection are shown.

When connected to a line group, the marker's primary function is to connect a line LC originating a call through the matrices and originating junctor to a register. Both reed relays and electronic circuitry are used to perform these jobs. The electronic circuitry provides all logic and scanning operations requiring high speed. Reed relays are used for connecting purposes, to switch in the necessary groups of leads into the electronic circuitry for analysis.

For each function, the marker performs several tasks. In general, for originating traffic, it must provide line number identification, pathfinding and route selection, sending of line number identification, class of service, and line group identity.

The tasks performed by the marker in processing a call are controlled by a sequence and supervisory circuit. All marker operations are governed by this control.

Included is the clock circuit which provides pulses to synchronize operations within the marker and the timing circuitry which is used to generate various time-out periods such as that provided between a reed relay operation and a succeeding electronic scanning operation.

The line identifier provides a unique identification of one calling line from the group of lines. By means of a contact L1 on the line reed relay, the identifier recognizes a request for service and is able to provide a three-digit line identification—hundreds, tens and units. Thus it is possible to uniquely mark one of the one thousand "pull" leads at the inputs to the A stage matrices. Reed relays are used for a "tree" configuration to reach the desired "pull" lead after the identity has been made.

Pathfinding consists of establishing an idle route through the A, B, and R matrices from the identified calling line to a register. The marker, after the line identity, preselects any idle register located on the outlets of the R matrix. The term "preselect" is used in that the selection is conditional upon whether an idle route exists back to the calling line. Having preselected a register junctor and register, the marker now has sufficient information to gate all originating junctors and AB links that can be reached from these two end points. The AB links will be marked busy or idle depending on whether they themselves are busy or idle. It now becomes a simple matter to scan these possibilities for an idle route. If no idle path can be found, another register is preselected which then presents other route possibilities. Having found an idle route, all information for completing the connection is available.

When acknowledgment is received from the register after marker information has been outpulsed, a "pull" potential is applied at the B matrix outlet to pull up in series the A, B crosspoints to the potential applied by the identifier at the input to the A matrix. Another "-pull" potential is applied to the R matrix outlet to pull up the R crosspoint. This A, B and R pull connection will be held until the cut-off reed relay operates.

At a signal from the register-sender circuitry the line number and line group identity is electronically pulsed out to the register-sender via the link connecting the R matrix and the register. Serial sending of information using high speed pulsing is employed.

The register acknowledges receipts of information and returns a command to the originating junctor to ground the C lead. The C lead holds the matrix connections and operates the cut-off reed relay that in turn grounds the pull lead. This signal is recognized by the marker, and the supervisory control removes the pull potentials. Rather than clearing out immediately, the marker waits a few milliseconds to see whether the connection is actually good, which means being held via the C lead. If all checks out, the marker enters a "clear out" interval where all functioning circuits are permitted to restore to normal before attempting to process other awaiting calls.

The continuity and foreign potential detector performs its operations during the interval that the marker is operating to set up the path from the calling subscriber to the register via the register-junctor RJ. Upon the marker receiving a call for service it grounds the lead marked RST on FIG. 2. This signal is removed during the path select operation and the test simulate lead SI is grounded. The ground potential from the simulate lead SI is removed during the interval that the marker is preparing to apply the "pull" potential to the matrices, after which a ground potential is applied to the test load TST. The testing by the continuity circuit then proceeds during the interval that the marker is pulling up the crosspoints of the selected path and prior to the time the marker has applied the hold potentials to the path held circuits.

Figures 2, 3:
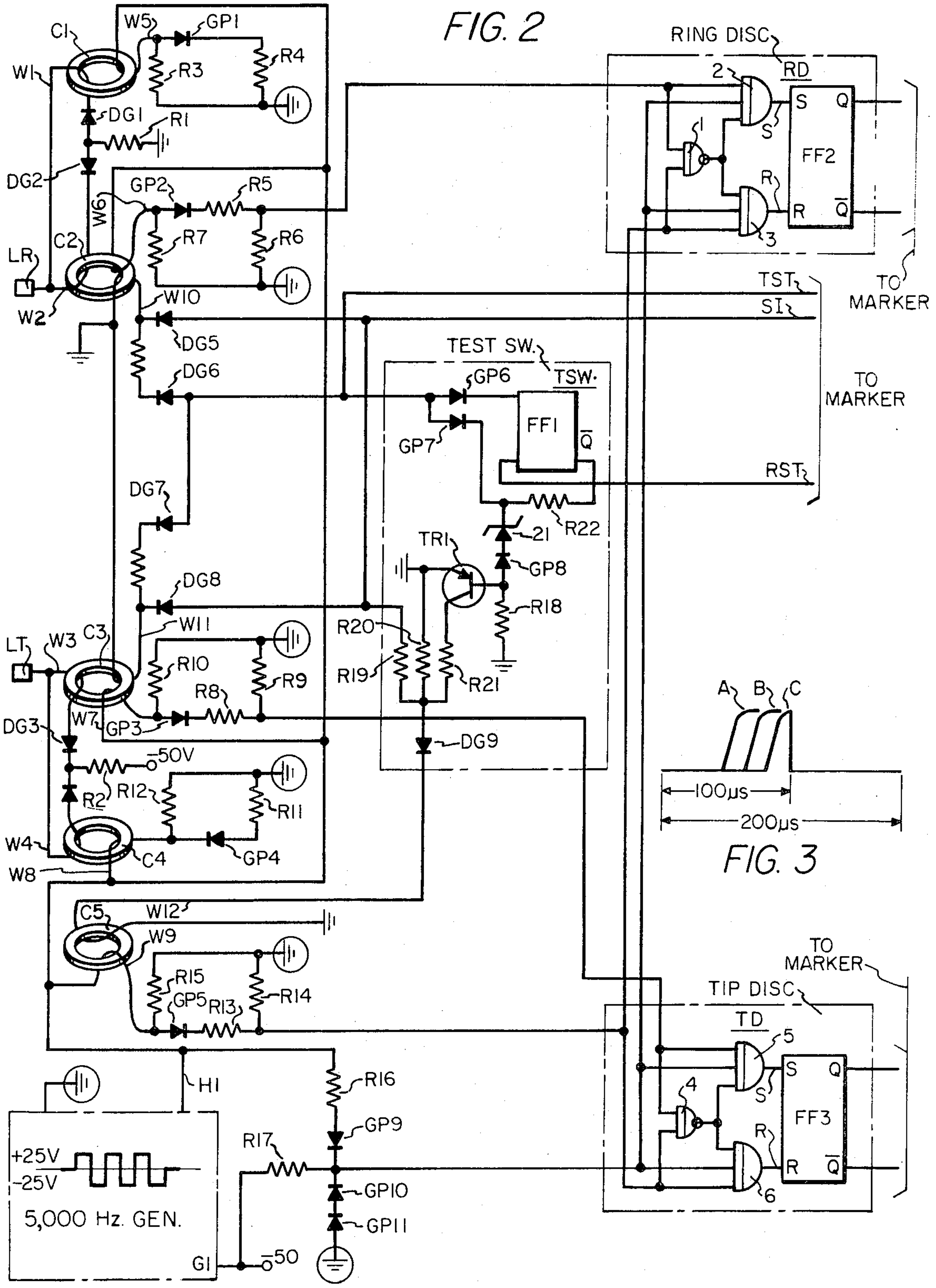
FIG. 2 shows a schematic of the continuity and foreign potential detector.
FIG. 3 is a graph showing the wave forms to the discriminators.

The test circuit of FIG. 2 consists of the cores C1 and C2 for the ring side of the line LR and cores C3 and C4 for the tip side of the line LT. Associated respectively with these cores is the ring discriminator circuit RD and the tip discriminator circuit TD. In common with these components is a comparison core C5, a 5,000 Hz. square wave generator G1 and a test switching circuit TSW.

The generator G1 may be of any conventional type capable of supplying a 5,000 Hz. output with a 50 volt swing from peak to peak. As shown it is connected to swing to +25 volts above and to −25 volts below the ground symbol shown encircled. This encircled ground is 25 volts above the exchange ground which is shown in the normal manner.

The ring side sense circuit connects to the equipment external of the marker at terminal LR and passes through a sense winding W1 and W2 on each of the cores C1 and C2 respectively, then through diodes DG1 and DG2 and a common resistor R1 to ground potential.

The tip side sense circuit is similar, commencing from the terminal LT through windings W3 and W4 of cores C3 and C4 through diodes DG3 and DG4 poled anode to cathode, through a common resistor R2 to negative battery potential.

Each of the cores C1, C2, C3 and C4 also has a second winding W5, W6, W7 and W8 that is connected to the square wave generator G1 output. The windings W5 and W6 are wound in opposite directions relative to each other. Winding W6 is terminated in a network consisting of diode GP1 in series with resistor R4 whose other terminal is connected to ground and paralleled by a resistor R3. Winding W6 is terminated by a network consisting of diode GP2 in series with resistors R5 and R6 to ground with the diode and two series resistors paralleled by resistor R7. The junction of resistors R5 and R6 is connected to gates 1 and 2 of the ring discriminator RD.

The windings W7 and W8 are also wound in opposite directions relative to each other. Winding W7 is terminated in the network consisting of diode GP3 in a series with resistors R8 and R9 to ground, with the diode and two resistors paralleled by resistor R10. The junction of resistors R8 and R9 is connected to the inputs of gates 4 and 5 of the tip discriminator TD. Winding W8 is terminated by the network consisting of diode GP4 in series with resistor R11 to ground, with resistor R12 in shunt with the series diode and resistor.

A fifth core C5 is also connected to the output of the 5,000 Hz. square wave generator G1 output in a manner similar to cores C2 and C3. The 5,000 Hz. is fed to winding W9 and then passes through the series path consisting of the diode GP5, poled anode to cathode, and the resistors R13 and R14 to ground, with resistor R15 in shunt of the entire grouping of diode and resistors. The junction of resistors R13 and R14 is connected to the inputs of AND gates 1 and 3 of the ring discriminator RD and to AND gates 4 and 6 of the tip discriminator TD, and is the source of the output against which the discriminators compare the outputs of the line connected cores. Also connected to the inputs of AND gates 2, 3, 5 and 6 is an input from the generator G1 which serves as the keying or clock input for these gates. This is taken through a clamping network consisting of resistor R16 connected from the output of generator G1 to the anode of diode GP9 to the gates and also through resistor R17 to the exchange battery as well as through the cathode to anode series path of diodes GP10 and GP11 to the generator ground.

The test switch TSW translates the signals from the marker to provide the proper bias to the comparison core C5. The primary load or bias for the comparison core C5 consists of resistor R20 in series with the diode DG9: when switching transistor TR1 is conducting, it places resistor R21 in parallel with resistor R20. This happens after the ground signal on lead TST is applied by the marker, which sets flip-flop FF1 but does not turn on TR1 until the ground potential on lead TST is removed. Diode GP7 shunts the output from the reset output of the flip-flop FF1. Upon the removal of the TST pulse the negative potential from the reset output of FF1 passes through diodes 21 and GP8 to the base of transistor TR1, turning it on. Resistor R18 is a bias resistor for the base of transistor TR1.

The shunt resistor R21 is removed when the marker applies a reset signal on lead RST to reset flip-flop FF1.

During certain stages of the marker operation a ground potential is applied to the simulate lead labeled SI. This has the effect of placing a load on cores C2 and C3 via diodes DG5 and DG8 to simulate a line connection to this circuit for the purposes of testing the response. The comparison core is also loaded via resistor R19.

The discriminators for the ring side of the line RD and for the tip side of the line TD each consists of two AND gates, a NAND gate and a flip-flop. The ring discriminator RD functions to set the flip-flop FF2 when the sense pulse from the junction of resistors R5 and R6 is wider than the comparison pulse from the junction of resistors R13 and R14. The sense pulse is applied to gates 1 and 2. Gate 1 normally has a positive output unless both of its inputs are energized, therefore gate 2 which will also have the sense pulse and the keying pulse direct from the generator G1 will pass a signal to the flip-flop FF2 to set it. When the sense pulse is narrower than the comparison pulse then gate 3 will be energized first to reset the flip-flop FF2. After either a set or a reset operation has occurred the output of gate 1 serves to block both gates 2 and 3 until completion of the test cycle.

The tip discriminator works in a similar manner. The sense pulse is an indication of the path resistance of the ring and tip line conductors when they are connected to the LR and LT terminals. The comparison pulse indicates what the maximum or minimum resistance should be at a given state of the marker cycle, that is, what it should be at a given point in the pulling path. The comparison pulse is controlled in such a manner that it represents alternately a maximum or a minimum reference. In this way the functioning of the circuit is also monitored.

The basic principle of the sensing process on which the operation of the foreign potential detector is based can be described as follows:

The 5 kHz. square wave is applied to the primary circuit of each of the cores. The cycle starts when the square wave is going positive (see FIG. 3).

The first half of the working cycle performs the sensing action and it will therefore be called the sensing pulse; it lasts for 100 μsec. The sensing pulse causes a current to flow in the primary and this current tends to magnetize the core. The magnetizing action is referred to as the "switching" of the core. Magnetizing action that results in saturation of the core in either direction is referred to as complete switching. If only part of the saturation flux level in a given direction is reached, this is referred to as partial switching. The sensing pulse also causes a current in the secondary if the secondary circuit is closed or there is a cross to another conductor. The secondary circuit is called the sensing circuit. The magnitude of this current—called the sensing current—depends on the resistance in the circuit. If the positive voltage applied to the primary is of sufficient duration, the core is driven into saturation in a direction corresponding to the drive current in the drive circuit. The presence of the sense current in the sense circuit will oppose the switching of the core. If the current flowing in the sensing circuit is high, the switching action is opposed more than if the sensing current is low. Hence the core will be switched less. An open sensing circuit results in full switching. A sensing circuit with finite resistance results in partial switching, see wave "A, B or C" of FIG. 3. The less resistance present in the sensing circuit, the less the extent of the partial switching.

The second half cycle of a working cycle is referred to as the display pulse. It lasts for 100 μsec. The display pulse is considered to start when the potential at the "-Hi" input terminal goes negative with respect to ground. During the display pulse, no current flows in the sensing circuit. The diodes DG1, DG2, DG3 and DG4 in the sense circuit prevent this. The negative going voltage applied to the display circuit causes the core to be switched towards the display saturation point. The input to the display circuit is such that switching into saturation is assured. If the core has been fully switched during the sensing half cycle, it will take a maximum of time to switch the core to saturation in the display direction. The current through the display circuit will remain low while the core is switching. The voltage drop caused by the display circuit current can be observed across a display resistor R6 and R9 (which is in series with a diode GP2 and GP3 to permit separation of the display current). The display current will show a sudden increase when core saturation has been reached, and therefore, there will be a step in the voltage across the display resistor at this time.

The time elapsing from the start of the display pulse to the point of sudden increase in the voltage across the display resistor is an indication of the extent to which the core has been switched during the sense pulse and, therefore, it also is an indication of the resistance which is present in the sense circuit during the sense pulse. The longer the interval from the start of the display pulse to the point of increase in the display voltage the higher the resistance in the sense circuit. If we call the appearance of the voltage across the display resistor the display pulse, we may say that a high resistance in the sense circuit means a narrow display pulse across the display resistor. A low resistance in the sense circuit produces a wide pulse across the display resistor.

It is evident, from the above, that the sensing action is separated in time from the display action. The core senses during the first half cycle of the square wave and displays during the second half cycle of the square wave, the first half being the one that has the correct polarity to cause a current in the secondary. The action of the core and its associated circuits can be compared to a camera—the sensing cycle provides the snapshot and the display cycle may be likened to the development. The immediate advantage of this method of operation is that it avoids threshold effects.

What is claimed is:

1. A conductor testing circuit for determining the condition of a conductor comprising: first, second and third magnetic cores displaying substantially rectangular hysteresis characteristics, each of said cores having set and reset states of remanent magnetization and saturation, an alternating current generator having an output, a first winding on each of said first and second cores having one end connected to said conductor and the other connected to the nominal potential of said conductor, a first impedance, a first winding on said third core connected across said first impedance, a discriminator means having first and second state outputs, a second winding on each of said first and third cores having one end connected to said generator output, the other end of said second winding of said first and third core connected to said discriminator means, said first impedance and said first winding on said third core effective to provide a delay to alternating current via said second winding on said third core, and means in said discriminator operated in response to receipt of said generator output from said first core before said generator output from said third core to produce a first positive output.

2. A testing circuit as claimed in claim 1 wherein said discriminator comprises a flip-flop having a set input and a reset input, and first and second two-input AND-gates, said first AND-gate output connected to said flip-flop set input, said second AND-gate output connected to said flip-flop reset input, one of said two inputs of said first AND-gate connected to said generator output and the other of said two inputs connected to said first core second winding other end, one of said two inputs of said second AND-gate connected to said generator output and the other of said two inputs connected to said third core second winding other end.

3. A testing circuit as claimed in claim 1 wherein said generator output is a 5,000 Hz. square wave.

4. A testing circuit as claimed in claim 1 further including a second impedance and a test switch operated from external control means, said test switch effective upon operation to place said second impedance in parallel with said first impedance, whereby said third core output is delayed.

5. A testing circuit as claimed in claim 4 further including a third winding on said first core, said third winding connected between a ground potential and an output of said test switch, said third winding and said test switch effective to change the delay time of said first core whereby a fault is simulated.

6. A testing circuit for determining the condition of a multi-conductor communication path comprising: an alternating current generator having a square wave output, a first impedance, a comparison core having a first winding connected across said first impedance, a conductor sensing arrangement for each conductor of said multi-conductor path having: first and second magnetic cores displaying substantially rectangular hysteresis characteristics, each of said cores having set and reset states of remanent magnetization and saturation, a first winding on each of said first and second cores having one end connected to said conductor and the other connected to the nominal potential of said conductor, a discriminator means having a first and a second state, a second winding on said first core having one end connected to said generator output, the other end of said second winding connected to said discriminator means, a second winding on said comparison core having one end connected to said generator output and the other end connected to each said discriminator means, and means in said discriminator operated in response to receipt of said generator output from each said first core before said generator output from said third core to produce a first positive output indicative of a proper condition of said corresponding conductor.

7. A testing circuit as claimed in claim 6 wherein said generator output is a 5,000 Hz. square wave.

8. A testing circuit as claimed in claim 6 further including a second impedance and a test switch operated from external controls means, said test switch effective upon operation to place said second impedance in parallel with said first impedance, whereby said third core output is delayed.

9. A testing circuit as claimed in claim 6 further including a line battery feed source and a diode connected from each said first winding to said battery feed source and poled to pass a current in the normal battery feed direction of said conductor.

10. A testing circuit as claimed in claim 6 further including a diode connected from each said second winding to said discriminators to pass only the positive pulses of said generator output.

* * * * *

UNITED STATES PATENT OFFICE
CERTIFICATE OF CORRECTION

Patent No. 3,691,309 Dated September 12, 1972

Inventor(s) GARTNER/VAN HUSEN

It is certified that error appears in the above-identified patent and that said Letters Patent are hereby corrected as shown below:

On the cover page, line [73] delete "Autamtic Electric Laboratories, Inc." and add -- GTE Automatic Electric laboratories Incorporated --

Signed and sealed this 17th day of April 1973.

(SEAL)
Attest:

EDWARD M.FLETCHER,JR.
Attesting Officer

ROBERT GOTTSCHALK
Commissioner of Patents